United States Patent Office 2,963,462
Patented Dec. 6, 1960

2,963,462

BUTYL RUBBER CONTAINING A DIMETHYLOL ALKYL PHENOL, A FRIEDEL-CRAFTS CATALYST AND A NITRO-PARAFFIN AND METHOD OF CURING BUTYL RUBBER

Clinton A. Braidwood, Schenectady, N.Y., assignor to Schenectady Varnish Company, Inc., Schenectady, N.Y., a corporation of New York No Drawing. Filed Aug. 27, 1957, Ser. No. 680,644

20 Claims. (Cl. 260—32.4)

This invention relates to the reaction between Butyl rubber and dimethylol phenols.

It has previously been proposed, e.g. in Tawney et al. Patent 2,701,895, to cure Butyl rubber with the aid of a dimethylol phenol. In order to accelerate the cure, it has been suggested in Peterson et al. Patent 2,726,224, to also employ a minor amount of a metal halide of the group of aluminum and heavy metals. This patent indicates that aluminum chloride is not a preferred catalyst.

Aluminum chloride is considered to be a "hot catalyst" and presents a serious problem in handling because of its hydroscopic characteristics. Additionally, anhydrous aluminum chloride liberates hydrogen chloride gas immediately when in contact with the atmosphere. Furthermore, it is difficult to control or slow down the catalytic action of aluminum chloride.

The previous work on the use of metal halides as accelerators for the curing of Butyl rubber with dimethylol phenols has been confined to an all solids basis, e.g. to mold Butyl rubber into water curing bags, tires, and the like. When an attempt was made to compound the metal halide with the Butyl rubber in the presence of the dimethylol para hydrocarbon substituted phenol and then dissolve into solution the stability of the mixture and the uniformity of the solution was unsatisfactory. Furthermore, "hot catalysts" such as aluminum chloride had a short life when milled into the Butyl rubber in the presence of the dimethylol phenol.

Accordingly it is an object of the present invention to improve the process of using a metal halide as an accelerator for the curing of Butyl rubber with a dimethylol phenol.

Another object is to more efficiently utilize aluminum chloride as such an accelerator.

A further object is to cure Butyl rubber with a dimethylol phenol using a metal halide accelerator while the mixture is in the form of a solution.

A still further object is to reduce the handling problems in connection with the use of aluminum chloride as an accelerator for the dimethylol phenol curing of Butyl rubber.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing the metal halide in the form of a solution in a nitroparaffin.

Butyl rubber is the type of synthetic rubber made by copolymerizing an isoolefin, usually isobutylene, with a minor proportion of a multi-olefin having from 4 to 14 carbon atoms per molecule. The conditions of polymerization and suitable isoolefins and multiolefins are shown for example in Thomas et al. Patent 2,356,128. The isoolefins used generally have from 4 to 7 carbon atoms. While isobutylene is the preferred isoolefin, other isoolefins such as 2-methyl butene-1; 2-ethyl butene-1; 2-methyl hexene-1; etc. The multiolefin usually is an aliphatic conjugated diolefin having from 4 to 6 carbon atoms and is preferably isoprene or butadiene. Other suitable multiolefins include piperylene; 2,3-dimethyl butadiene-1,3; 1,2-dimethyl butadiene-1,3; 1,3-dimethyl butadiene-1,3; 1-ethyl butadiene-1,3; 1,4-dimethyl butadiene-1,3; hexadiene-2,4; heptadiene-1,3, and cyclopentadiene. The Butyl rubber contains only relatively small amounts of copolymerized diene, usually from about 0.5 to 5%, and seldom more than 10% of the total weight of the elastomer.

The dimethylol phenol curing agents are known materials and are typically made by reacting a para-substituted phenol having the two ortho positions unoccupied, with a considerable excess of formaldehyde, the molar ratio of formaldehyde to phenol being 2:1 for example, in the presence of a strong alkaline catalyst such as an alkali metal hydroxide, e.g. sodium hydroxide. The mixture of the para-substituted phenol, formaldehyde and alkaline catalyst may be reacted at a suitable temperature, e.g. 25–100° C. to effect the formation of the 4-subtituted-2, 6-dimethylol phenol. This phenol dialcohol can be isolated by acidification of the mixture and separation of the oily layer, which can then be partially polymerized to the resol stage by heating, e.g. at 75–175° C. The resol has the advantage that it is more reactive with Butyl rubber than the lower molecular weight material. Isolation of the phenol dialcohol can be omitted, in which case the reaction is carried past the monomer stage to the resol stage and the mixture thus obtained neutralized, the water removed and the resol recovered. The resols are commercially available resins, sold under trade names such as Amberol ST–137 (a solid resol made by condensing 1 mol of p-octyl phenol, 2 mols of formaldehyde and 1 mol of sodium hydroxide with neutralization of the alkali after the condensation is complete). The resols are oil-soluble and heat-reactive; i.e. capable of being converted by heat to a cured state without the necessity of adding of formaldehyde-yielding curing agent. In this respect they are in contrast to novolaks which are usually prepared in acid medium and with a deficiency of formaldehyde so that they (the novolaks) are permanently fusible and soluble unless a source of formaldehyde is added to advance the cure.

The phenol from which the dimethylol phenol is made has a hydrocarbon group in the position para to the phenolic hydroxyl, examples being alkyl groups, especially alkyl groups having from 3 to 20 carbon atoms, the tertiary butyl and TT-octyl (alpha, alpha, gamma, gamma, tetramethyl butyl) groups being especially preferred. There can also be used phenols wherein the para-substituent is a cycloalkyl group, e.g. cyclopentyl or cyclohexyl, an aryl group such as phenyl and an aralkyl group such as benzyl and cumyl.

Examples of suitable diamethylol phenols that can be used in the invention either in the polymeric or monomeric form are 2,6-dimethylol-4-methylphenol; 2,6-dimethylol-4-t-butylphenol; 2,6-dimethylol-4-t-amylphenol; 2,6 - dimethylol-4-tt-octylphenol; 2,6-dimethylol-4-dodecylphenol; 2,6-dimethylol-4-phenylphenol; 2,6-dimethylol-4-benzylphenol; 2,6-dimethylol-4-(alpha, alpha-dimethylbenzyl) phenol, and 2,6-dimethylol-4-cyclohexylphenol.

Any of the foregoing materials can be used either in the monomeric form, or in the polymeric, resol form. Mixtures of the resinous polymeric dimethylol phenols with more or less of low molecular weight or monomeric dimethylol phenols can also be employed. The resinous dimethylol phenols are the preferred materials because they are more effective and more convenient to use. For the sake of convenience and brevity, the terms dimethylol phenol, or 2,6-dimethylol-4-hydrocarbon substituted phenol, will be used to refer to any of the monomeric or polymeric compounds, or to mixtures thereof, unless otherwise stated. The resol or polymeric 2,6-dimethylol-4-hydrocarbon substituted phenol is of course actually a limited self-condensation polymer of the monomeric 2,6-dimethylol-4-hydrocarbon substituted phenol. Such polymer is believed to be composed largely of molecules having at each end a phenolic nucleus providing a methylol group in each terminal ortho position; and in this sense the polymer itself is also a 2,6-dimethylol material. These terminal methylol groups render the resol polymer heat-reactive in contrast to the novolak type of resin.

The dimethylol phenols can be combined with the Butyl rubber in an amount 0.2 to 50 parts of the phenol per 100 parts of the Butyl rubber. Usually at least 2 parts of the phenol per 100 parts of Butyl are employed.

As the metal halide there can be employed conventional Friedel-Crafts catalysts including the heavy metal halides (cf. the periodic charts of the elements in "Introductory College Chemistry" by H. G. Deming), and aluminum halides. Thus there can be used stannic chloride, stannous chloride, zinc chloride, ferric chloride, aluminum chloride, chromium chloride, nickel chloride, cobalt chloride, manganese chloride and copper chloride. Copper halides are not preferred due to the known deleterious effects of copper on Butyl rubber in respects not related to acceleration. The preferred accelerator is aluminum chloride and by dissolving aluminum chloride in the nitroparaffin, the otherwise "hot" catalyst is easily controlled through what is believed to be the formation of a complex which moderates or takes the "hot spots" off the aluminum chloride and hence permits aluminum chloride to be used successfully.

Other halides can also be used such as aluminum bromide, aluminum iodide, stannic iodide and aluminum fluoride. The heavy metal halides are effective independently of the oxidative state of the metal and they are even effective if the halide is partially hydrolyzed, or is only a partial halide, as in zinc oxychloride and aluminum oxychloride.

The metal halide should be used in an amount sufficient to accelerate the curing or modifying of the Butyl rubber. This amount is generally within the range of a few tenths of a part (e.g., 0.2 part) to 10 parts per 100 parts of the rubber and is preferably about 1 to 2 parts per 100 parts of the Butyl rubber.

As the nitroparaffin there can be employed nitromethane; nitroethane; 1-nitropropane, 2-nitropropane; 1-nitrobutane; 2-nitrobutane; 1-nitrohexane, or mixtures of such nitroparaffins or nitrocyclohexane or mixtures of nitrocyclohexane with such nitroparaffins. It will be observed that the nitroparaffins just mentioned have 1 to 6 carbon atoms. The proportion of nitroparaffin is not particularly critical although it should be sufficient to dissolve the metal halide. Generally, 1 to 50 parts of nitroparaffin are employed per part of metal halide. It has frequently been found desirable to make up the metal chloride as a 10% solution in the nitroparaffin.

The mixture of the dimethylol phenol and Butyl rubber are usually dissolved in an aromatic solvent. As the solvent there can be used aromatic hydrocarbons, e.g., benzene, toluene, ortho-xylene, para-xylene, meta-xylene, mixed xylenes, aromatic naphtha, ethyl benzene, cumene, and aliphatic hydrocarbons such as the alkanes, e.g., hexane, heptane, gasoline, V. and M.P. naphtha, etc. The amount of solvent is not critical but generally the dimethylol phenol and Butyl rubber are cold or hot cut to 5 to 35% or 40% solids, preferably about 25% solids.

To the solution of the dimethylol phenol and Butyl rubber, e.g. as 25% total solids in toluene there is added 1 or 2% by weight of the Butyl rubber of the metal chloride made up as an approximately 10% solution in a nitroparaffin.

The mixture of Butyl rubber, dimethylol phenol, metal halide, hydrocarbon solvent, and nitroparaffin solvent are then heated, e.g. in an oven at a temperature and time necessary to effect reaction between the Butyl rubber and the dimethylol phenol. Generally, the curing is carried out at temperatures from 200 to 400° F. at a time of from 5 to 300 minutes. The preferred curing temperature is about 285 to 350° F. As a rule the higher the temperature the shorter the time required for curing.

By means of the instant invention a hot catalyst such as aluminum chloride, for example, is dissolved in a nitroparaffin so that the aluminum chloride action is moderated. This enables the use of the Butyl rubber and phenolic resin in solution form during the curing and pre-curing stages. Consequently, not only can the Butyl rubber-dimethylol phenol blend be used to form curing bags, tires, hoses, belts, and the like but the blend can also be used to make friction materials such as extruded brake linings. Additionally, the dimethylol phenol-Butyl rubber solutions can be used to impregnate or otherwise treat cloth, paper or plastic films or to form protective coatings, e.g. on paper, plastics, metals, etc. Cements for adhesives or sealing compounds for can construction can also be cured with the catalyst system of the instant invention at a much lower temperature and in a shorter period of time than in the methods used up to the present time.

The reaction of a solution of Butyl rubber with a dimethylol para hydrocarbon substituted phenol in the presence of a metal halide dissolved in a nitroparaffin has additional advantages over Butyl stocks containing the dimethylol phenol and in which the metal halide is merely milled into the compound. This Butyl rubber and the dimethylol phenol having the metal halide milled into the stock has limited storage life and consequently must be immediately cold cut into solution. The solution thus prepared has limited stability. The liquid catalyst mixture of metal halide in nitroparaffin on the other hand can be added quickly and conveniently to a stable Butyl rubber and dimethylol phenol solution just prior to application.

The milling of stannic, zinc, or aluminum chloride or other metal halide never results in 100% dispersion of these materials in the Butyl rubber when mechanical means, e.g. milling or Banburying are employed. In contrast, a complete homogeneity is assured for the reaction mechanism between dimethylolphenol and Butyl rubber in solution when a solution of a metal halide, e.g. aluminum chloride in a nitroparaffin is used.

Unless otherwise stated all parts and percentages in the instant specification and claims are by weight.

*Example 1*

200 grams of Enjay Butyl 325 (copolymer of isobutylene and isoprene containing a few percent of the isoprene) were broken down on a rubber mill and then together with 30 grams of dimethylol p-diisobutyl phenol resol and 720 grams of toluene were added to a suitable mixer and churned until uniform to form solution A.

A nitromethane solution of aluminum chloride (anhydrous) was prepared by adding 10 grams of the aluminum chloride to 100 grams of nitromethane with agitation to form solution B.

To 95 grams of solution A there was added 10 grams of solution B to form solution C.

Twenty grams portions of solutions A and C were placed in aluminum deep dishes. These in turn were placed in a forced draft oven at various times and temperatures so the reaction rate between the Butyl rubber and the dimethylol p-diisobutyl phenol (cure) could be noted. Cure was determined by surface tackiness, elongation, strength of film and specimen's solubility in toluene.

|  | 1<br>Solution A | 2<br>Solution C | 3<br>Solution C |
|---|---|---|---|
| Time (Min.) | 120 | 10 | 15. |
| Temp., °F | 285 | 350 | 285. |
| Cure | Slight tack surface. | Dry surface | Dry surface. |
| Solubility in Toluene | Slightly soluble. | Insoluble | Insoluble. |

*Example 2*

100 grams of Enjay Butyl 325 were broken down on a rubber mill and then together with 50 grams of dimethylol p-diisobutyl phenol resol and 400 grams of toluene were added to a mixer and churned until uniform to form solution A.

A nitromethane solution of aluminum chloride was prepared by adding 10 grams of the aluminum chloride to 100 grams of nitromethane with agitation to form solution B.

To 100 grams of solution A there was added 3.34 grams of solution B to form solution C.

Solution C contained ⅓ by weight dimethylol p-diisobutyl phenol resol and ⅔ by weight of Butyl rubber together with 1.65 parts of aluminum chloride per 100 parts of Butyl.

10 gram portions of solution C were placed in aluminum deep dishes and these in turn were placed in a forced draft oven at 325° F. and the time recorded to effect the reaction between the Butyl and the resol. After the cure or reaction of the Butyl and resol was noted. The compositions were further held at 325° F. to observe over curing or embrittlement of the films. Curing was determined as in Example 1.

| Temp., °F | 325 | 325 | 325 | 325 | 325. |
|---|---|---|---|---|---|
| Time (Min.) | 15 | 30 | 60 | 90 | 120. |
| Cure | cured | cured | cured | cured | cured. |
| Solubility in Toluene | slight swelling | insoluble | insoluble | insoluble | insoluble. |

After 30 minutes at 325° F. no appreciable loss of flexibility or gain in toughness with added heat was observed.

*Example 3*

200 grams of premilled Enjay Butyl 325 was added with 30 grams of dimethylol p-diisobutyl phenol resol and 600 grams of toluene to a reaction flask equipped with an agitator and reflux condenser. Heat was applied during agitation at 312–230° F. until all the Butyl and resol were in solution. After complete solution was obtained 2 grams of powdered stannic chloride were added. The mixture was heated without reflux at a temperature of 230–240° F. for 1 hour and 15 minutes at the end of which time the batch gelled. The stannic chloride had sealed out as small particles on the walls and also had settled to the bottom of the flask. There was poor catalyst distribution and the catalyst was not completely soluble in this system.

*Example 4*

85 parts of Enjay Butyl 325 were premilled and then incorporated with 15 parts of dimethylol p-diisobutyl phenol resol and 300 parts toluene in the same manner as Example 1 to form solution A.

10 parts of stannic chloride were dissolved in 90 parts of nitromethane with agitation to form solution B.

To 100 grams of solution A were added 4.25 grams of solution B to form solution C. 10 grams portions of this solution were placed in aluminum deep dishes and placed in a forced draft oven at 325° F. and the curing characteristics between the Butyl and the resol were observed with the following results:

30 minutes at 325° F. tacky throughout
60 minutes at 325° F. tacky throughout
90 minutes at 325° F. slight tack throughout
120 minutes at 325° F. slight tack throughout The cured film had inferior characteristics in comparison to aluminum chloride-nitromethane cured films but the products were definitely superior to those obtained in Example 3.

*Example 5*

To 100 grams of solution A of Example 4 were added 4.25 grams of a 10% solution of aluminum chloride in 2-nitropropane. The curing rate of the Butyl rubber and dimethylol p-diisobutyl phenol resol were comparable to those obtained in Example 1 and the product had similar properties to that of Example 1.

Fillers can be incorporated in the products of the present invention and, in some instances, the use of a filler greatly improves the properties of the product. Among the fillers which can be used are zinc oxide, carbon black, clay, silicon dioxide, calcium silicate, aluminum silicate, etc.

*Example 6*

1.4 parts of zinc oxide were milled into 24.2 parts of Enjay Butyl 325. This mixture was then cold cut with a mixture of 11.9 parts of dimethylol p-diisobutyl phenol resol in 74.4 parts of toluene to form solution A.

To 71 grams of solution A were added 2.26 grams of a 10% solution of aluminum chloride in nitromethane. Film cures obtained at 325° F. after 30 minutes, 60 minutes, 90 minutes, and 120 minutes were dry but not quite as strong as those stocks made with Butyl rubber and dimethylol p-diisobutyl phenol resol and aluminum chloride-nitromethane omitting the zinc oxide.

*Example 7*

To 71 grams of solution A of Example 6 were added 2.26 grams of a 10% solution of stannic chloride in nitromethane. Film cures obtained at 325° F. after 30 minutes, 60 minutes, and 90 minutes were tack free, and showed greatly improved toughness and tighter cure than the same cures containing no zinc oxide in the base Butyl stock. The products were definitely superior to those of Example 4.

*Example 8*

Example 1 was repeated replacing the 720 grams of toluene by 720 grams of n-hexane. The results obtained in this example were similar to those in Example 1.

*Example 9*

Example 2 was repeated replacing the 400 parts of toluene by 400 parts of heptane. The results obtained in this example were similar to those in Example 2.

*Example 10*

The process of Example 6 was repeated but the 74.4 parts of toluene were replaced by the same amount of V. and M.P. naphtha. The results obtained were similar to those in Example 6.

I claim:

1. As a composition of matter a synthetic rubber copolymer of an isoolefin having from 4 to 7 carbon atoms with from 0.5 to 10% of a conjugated diolefin having from 4 to 14 carbon atoms, a 2,6-dimethylol-4-hydrocarbon substituted phenol wherein the hydrocarbon is selected from the group consisting of alkyl, cycloalkyl, aryl and aralkyl radicals, a Friedel-Crafts metal halide and a member of the group consisting of a liquid nitroparaffin containing 1 to 6 carbon atoms and nitrocyclohexane.

2. As a composition of matter a synthetic rubber copolymer of an isoolefin having from 4 to 7 carbon atoms with from 0.5 to 10% of an aliphatic conjugated diolefin having from 4 to 6 carbon atoms, a 2,6-dimethylol-4-hydrocarbon substituted phenol wherein the hydrocarbon is selected from the group consisting of alkyl, cycloalkyl, aryl and aralkyl radicals, a Friedel-Crafts metal halide and a member of the group consisting of a nitroparaffin containing 1 to 6 carbon atoms and nitrocyclohexane.

3. A composition according to claim 2 including an aromatic hydrocarbon as a solvent.

4. A composition according to claim 2 wherein the metal halide is aluminum chloride.

5. A composition according to claim 2 including a hydrocarbon solvent.

6. A composition according to claim 5 wherein the hydrocarbon solvent is an aliphatic hydrocarbon.

7. As a composition of matter a synthetic rubber copolymer of isobutylene with from 0.5 to 10% of an aliphatic conjugated diolefin having from 4 to 6 carbon atoms based on the total weight of the copolymer, a 2,6-dimethylol-4-hydrocarbon substituted phenol wherein the hydrocarbon is selected from the group consisting of alkyl, cycloalkyl, aryl and aralkyl radicals, aluminum chloride, and a member of the group consisting of a nitroparaffin having 1 to 6 carbon atoms and nitrocyclohexane.

8. A composition according to claim 7 including an aromatic hydrocarbon solvent.

9. A composition according to claim 8 wherein the phenol is 2,6 - dimethylol - 4 - $\alpha,\alpha,\gamma,\gamma$-tetramethylbutyl phenol.

10. A composition according to claim 7 including an aromatic hydrocarbon solvent and wherein the aluminum chloride is present in an amount of from a few tenths of a part to 10 parts per 100 parts of the rubber.

11. A composition according to claim 7 wherein said phenol is 2,6 - dimethylol - 4 - $\alpha,\alpha,\gamma,\gamma$-tetramethylbutyl phenol.

12. A composition according to claim 7 wherein said member is nitromethane.

13. A composition according to claim 7 wherein said member is nitroethane.

14. A composition according to claim 7 wherein said member is nitropropane.

15. A composition according to claim 14 wherein the phenol is 2,6 - dimethylol - 4 - $\alpha,\alpha,\gamma,\gamma$-tetramethylbutyl phenol.

16. A composition according to claim 7 wherein said member is nitrobutane.

17. The method of chemically modifying a synthetic rubber copolymer of an isoolefin having from 4 to 7 carbon atoms with from 0.5 to 10% of an aliphatic conjugated diolefin having from 4 to 6 carbon atoms based on the total weight of the copolymer comprising heating said rubber to a temperature from 200 to 400° F. in admixture with a 2,6-dimethylol-4-hydrocarbon substituted phenol, said hydrocarbon being selected from the group consisting of alkyl, cycloalkyl, aryl and aralkyl in the presence of a Friedel-Crafts metal halide accelerator dissolved in a member of the group consisting of liquid nitroparaffins containing 1 to 6 carbon atoms and nitrocyclohexane.

18. A method according to claim 17 wherein the rubber and phenol are dissolved in an aromatic hydrocarbon.

19. A method according to claim 18 wherein the isoolefin is isobutylene.

20. A method according to claim 19 wherein the metal halide is aluminum chloride.

References Cited in the file of this patent

UNITED STATES PATENTS

| | | |
|---|---|---|
| 2,536,136 | Lucid | Jan. 2, 1951 |
| 2,726,224 | Peterson et al. | Dec. 6, 1955 |
| 2,739,954 | Fryling | Mar. 27, 1956 |
| 2,782,829 | Peterson et al. | Feb. 26, 1957 |

OTHER REFERENCES

Thomas: "Anhydrous Aluminum Chloride," Reinhold Publishing Co., 1941, page 25.